Sept. 20, 1966 R. P. SAUNDERS 3,273,452
ADJUSTING MECHANISM FOR PHOTOGRAPHIC APPARATUS
Filed Aug. 31, 1964 2 Sheets-Sheet 1

United States Patent Office ──

3,273,452
Patented Sept. 20, 1966

3,273,452
ADJUSTING MECHANISM FOR PHOTOGRAPHIC
APPARATUS
Robert P. Saunders, 113 Creekmeadow Lane,
Greece, N.Y.
Filed Aug. 31, 1964, Ser. No. 393,164
7 Claims. (Cl. 88—24)

This invention relates to photographic apparatus, and more particularly to mechanism for adjusting moving parts of such apparatus.

In various types of photographic apparatus, it is necessary to adjust one part relative to another part, in a smooth manner through infinitesimal increments, and to hold the adjust part firmly in adjusted position until it is purposely moved to another adjusted position. At the same time, the adjusting mechanism must be easy to manipulate with one hand. Examples of photographic apparatus where such adjustment is needed are photographic easels, where such adjusting mechanism is needed for accurate fine and smooth adjustment of the masking strips which overlie the margins of the paper; photographic enlargers where such adjusting mechanism is desirable both for adjusting the main body of the enlarger upwardly and downwardly along the rail or track and for adjusting the lens board upwardly and downwardly relative to the film holder, for focusing; and certain types of photographic cameras, such as copying cameras, where such adjusting mechanism is desirable for moving the camera lens board toward and away from the focal plane, for focusing purposes.

An object of the present invention is the provision of generally improved and more satisfactory adjusting mechanism suitable for purposes such as those outlined above.

Another object is the provision of adjusting mechanism suitable for these purposes, of particularly simple and inexpensive construction, easy to assemble, and highly effective and trouble-free in use.

A further object is the provision of adjusting mechanism easily manipulated by one hand, yet holding the adjusted part frictionally and firmly in the adjusted position to which it has been set, without danger of accidental displacement even under conditions of vibration.

These and other desirable objects may be attained in the manner disclosed as an illustrative embodiment of the invention in the following description and in the accompanying drawings forming a part hereof, in which.

While the adjusting mechanism of the present invention is useful in various ways in connection with various kinds of photographic apparatus as above indicated, it finds probably its greatest usefulness in connection with adjustment of the masking blades or strips of a photographic enlarging easel, and so will be described in this environment as a preferred example of the use of the invention.

Figure 1:
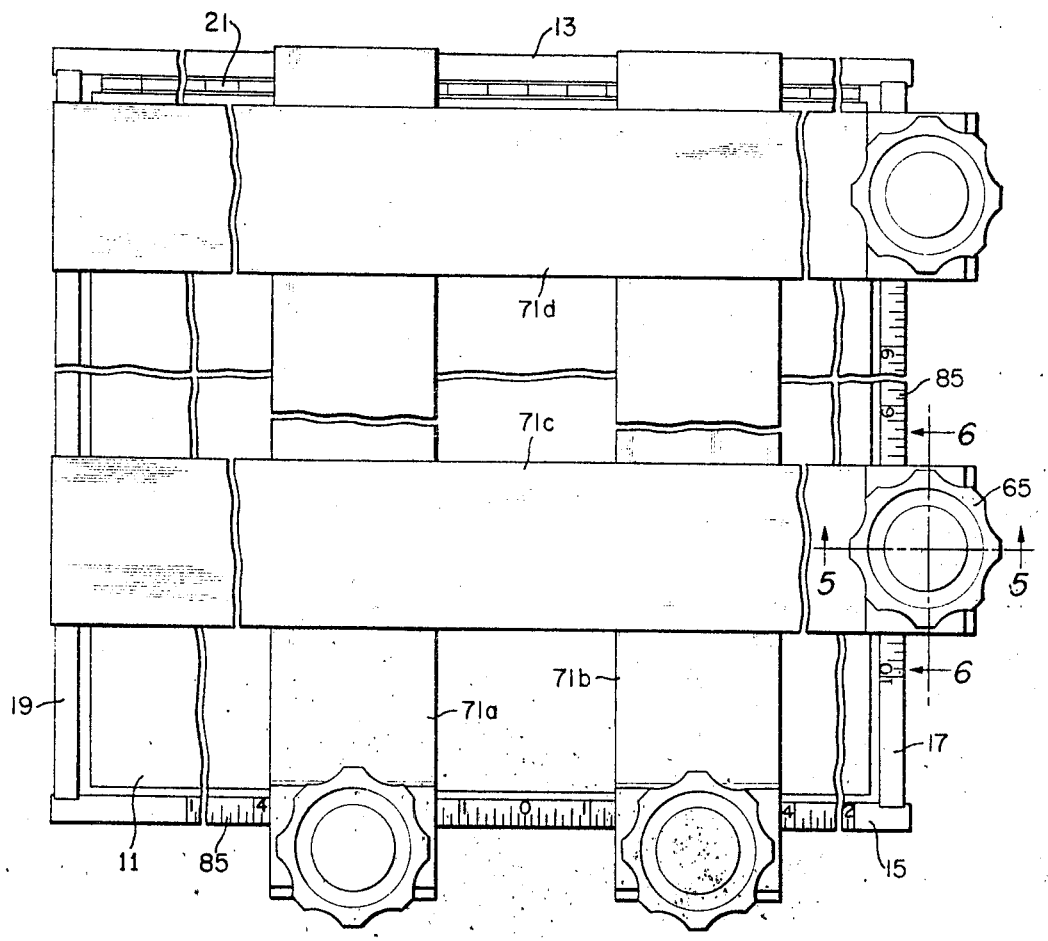
FIG. 1 is a plan view of a photographic enlarging easel, with parts broken away, showing a preferred form of adjusting mechanism according to the present invention for adjusting the position of the masking strips of the easel.

Referring first to FIG. 1, there is shown a photographic easel which, except for the adjusting mechanism of the present invention, may be of conventional construction. The easel comprises the usual baseboard 11, customarily of rectangular outline, having around all four sides of the board a hollow rectangular frame formed of rods or rails 13 at the rear edge of the easel, 15 at the front edge, 17 at the right edge and 19 at the left edge. The rails 17 and 19 join the respective ends of the rails 13 and 15 to each other, to form a rigid rectangular frame. The rear rail 13 is hinged to the rear edge of the board by a hinge 21, so that the front rail 15 may be raised up, carrying the rails 17 and 19 with it and turning the rail 13 on its hinge, so as to raise the masking blades or strips which are carried by the rails.

Figure 5:
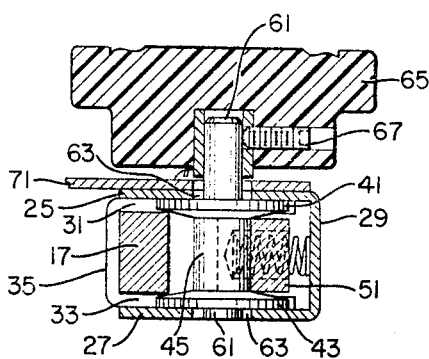
FIG. 5 is a section taken approximately on the line 5—5 of FIG. 1.
Figure 6:
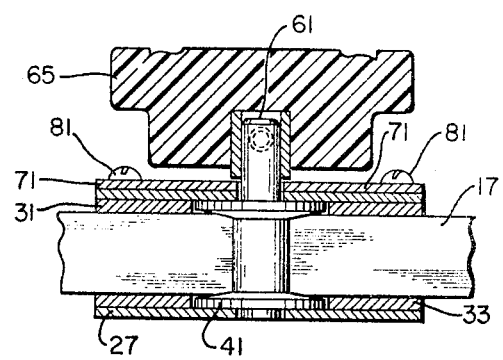
FIG. 6 is a section taken approximately on the line 6—6 of FIG. 1.

Each of the rails 13, 15, 17 and 19 may be of identical rectangular cross section, that of the rail 17 being seen in FIG. 5. The adjusting mechanism of the present invention rides along any selected one of these rails, carrying with it the particular masking blade attached thereto. Since the construction of all of the adjusting mechanisms or carriages is the same, regardless of which rail they ride on, a description of one will suffice for all.

Referring now to the detailed views constituting FIGS. 3–6, each of the adjusting mechanisms or carriages is formed of sheet metal bent up to provide two parallel side walls 25 and 27 and an edge wall 29 integrally joining corresponding edges of the walls 25 and 27 to each other, the three walls together forming a hollow body of approximately U-shaped cross section as seen in FIG. 5. The open side of this U-shaped body is only partially closed near its respective ends, by two U-shaped members or stirrup members formed of sheet metal with side walls 31 and 33 integrally joined together by an edge wall 35. The dimensions of the members 31, 33, 35 are such that the outer faces of the walls 31 and 33 lie snugly against the inner faces of the main walls 25 and 27, and are welded thereto. The walls 35 of the two stirrup members serve to close the open side of the main member 25, 27, 29 near its opposite ends, but there is a considerable gap 37 where this open side is not closed.

The rail on which the adjusting carriage moves (here illustrated, for example, as the rail 17) extends longitudinally through the carriage, two opposite faces of the rail being snugly but slidably engaged by the inner faces of the walls 31 and 33, while a third face of the rail is snugly and slidably engaged by the inner face of the wall 35 of each stirrup member. At the corners of the fourth face of the rail, the rail is engaged by end flanges 41 and 43 on spool member indicated in general at 45 and shaped somewhat like a common spool used for winding sewing thread, with a portion of reduced diameter between the two flanges 41 and 43. The outer faces of the end flanges are perpendicular to the axis of rotation of the spool, and bear snugly but rotatably against the inner faces of the main side walls 25 and 27 of the carriage, in the space between the stirrup members at opposite ends of the carriage. The inner faces of the end flanges 41 and 43 are tapered or beveled as plainly seen in FIGS. 5 and 6 at a sharp angle only a few degrees away from a plane perpendicular to the axis of rotation, and are so dimensioned that the tapers of the inner faces of these end flanges will cause a wedging action firmly against the adjacent corners of the longitudinal rail, as readily seen in FIG. 5, the end flanges of the spool member somewhat overlapping the rail as seen especially in FIGS. 4 and 5.

To push the spool toward the rail and thus wedge the tapered flange parts against the corners of the rail, there is a bearing block 51 (FIGS. 4 and 5) extending longitudinally of the carriage, parallel to the rail and having near the center of its left hand face (when viewed as in FIG. 4) an approximately semi-circular groove or notch 53 which receives the reduced diameter central part of the spool member. In the opposite or right hand face of the bearing block 51 are two bores 55 extending part way through the thickness of the block, in a direction perpendicular to the length of the rail 17, and each bore receives one end of a coil spring 57, the opposite end of which bears against the inner face of the wall 29 of the main carriage member, so that these springs 57 tend to push the bearing block 51 leftwardly when viewed as in FIGS. 4 and 5, thereby pushing the block against the spool 45 and pushing the tapered flanges of the spool against the corners of the rail 17 in a wedging manner.

A shaft 61 is fixed to the spool and extends out through the side walls 25 and 27 of the carriage through bearing openings 63 which fit the shaft rotatably but snugly in a direction longitudinally of the rail 17, but are somewhat elongated in a direction perpendicular to the rail 17, so as to allow the spool and its shaft a limited range of movement toward and away from the rail under the influence of the springs 57, to produce the desired wedging action. One end of the shaft (the lower end when viewed as in FIGS. 5 and 6) extends merely through the thickness of the wall 27 of the carriage, and terminates flush with the outer face of the wall. The other end of the shaft extends out through its slot in the wall 25 and projects a substantial distance beyond the wall, where it is provided with a manual operating knob 65 firmly secured to the shaft as by means of a set screw 67.

With this construction, rotation of the manual knob 65 will rotate the spool 45 so that the tapered flanges thereof, wedging tightly against the corners of the rail 17, will roll along the corners of the rail and cause the carriage to move longitudinally along the rail. The action of the spring loaded bearing block 51 pressing against the spool, plus the wedging action of the flanges on the edges of the rail, cause just enough frictional resistance to rotation of the spool and knob 65, so that the spool will not turn by itself even under conditions of vibration, but can be readily turned manually when desired. The arrangement permits smooth adjustment of the carriage longitudinally along the rail through infinitesimal increments of adjustment, merely by turning the knob 65 with one hand. But when the turning force is removed, the carriage remains stationary on the rail, held partly by the friction of the stirrup members 31, 33, 35 against the rail and partly by the wedging action of the spool flanges against the rail, aided by the friction of the bearing block 51 against the spool, which tends to resist rotation of the spool.

This provides a very excellent adjustment mechanism for the special requirements of photographic apparatus, where easy adjustment through infinitesimal increments, by one hand, and often under darkroom conditions, is a requirement, and where firm holding of the parts in adjusted position is also a requirement. When used on an easel, as illustrated in FIG. 1, each of the adjusting carriage mechanisms carries a masking blade, and in the construction here shown there are two adjusting carriages riding along the rail 15, with respective masking blades 71a and 71b respectively mounted on the two carriages. There are also, in this preferred form, two adjusting mechanisms or carriages riding on the rail 17, and they respectively carry masking blades 71c and 71d. Each masking blade is attached to its respective adjusting carriage in any suitable way as by means of screws 81 (FIG. 6) which pass through the blade 71 and into tapped openings extending both through the wall 25 and through the wall 31 of the adjusting carriage, thus giving adequate length of screw threads to hold the screws 81 firmly.

By turning the respective adjusting knobs 65, the respective adjusting carriages can be moved along their respective rails 15 and 17, and may be brought to any desired dimensional position thereon, by the aid of the graduated scales 85 which are preferably marked on the rails. In this way, the masking blades 71 (this numeral being intended to refer collectively to all of the separate masking blades 71a, 71b, 71c, and 71d) are brought to the desired positions to overlie the marginal edges of a sheet of photographic paper which is placed on the main easel board 11 beneath the masking blades, so that these blades, preferably made of metal such as steel or aluminum, mask the edges of the print which is to be made so as to provide the familiar white border, and leave just the right amount of exposure area in the central region between the respective blades.

Figure 2:
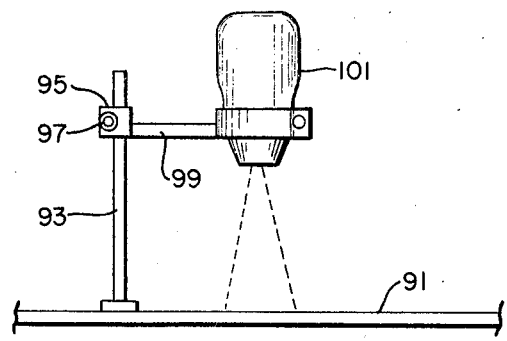
FIG. 2 is a somewhat schematic side elevation of a photographic enlarger, showing the adjusting mechanism of the present invention applied thereto.
Figure 3:
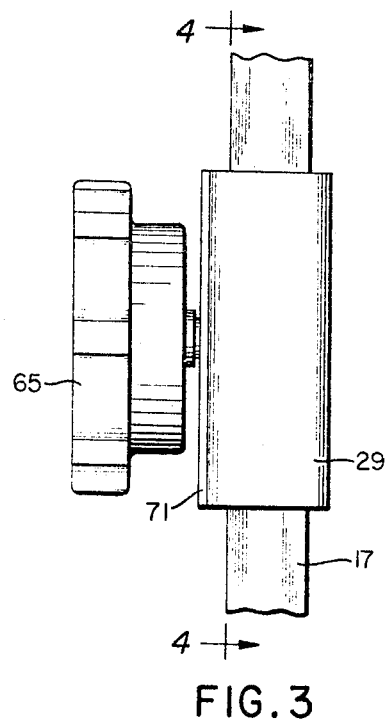
FIG. 3 is an edge view of the adjusting mechanism as used on a rail of the easel shown in FIG. 1.
Figure 4:
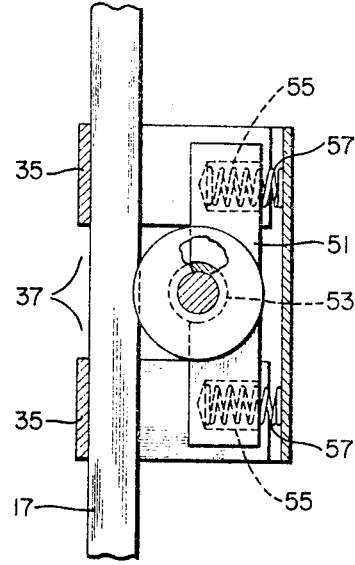
FIG. 4 is a section taken approximately on the line 4—4 of FIG. 3.

As another example of the usefulness of the adjusting mechanism of the present invention, there is shown in FIG. 2, in somewhat simplified schematic form, a photographic enlarger having a baseboard 91, and an upright rail or post 93 on which an adjusting carriage 95, of the same construction already described, rides upwardly and downwardly when the adjusting knob 97 is turned. Instead of carrying a masking blade as would be the case when the invention is used with an enlarging easel, the adjusting carriage 95 carries a lateral arm 99 which supports the enlarger head indicated in general at 101. Thus by turning the knob, the enlarger 101 is raised or lowered relative to the board 91, so as to provide the desired degree of magnification or enlargement, and the enlarger lens is adjusted for focusing by any conventional focusing mechanism, which may include another adjusting carriage of similar construction according to the present invention, if desired.

As the respective rails 15, 17, or 93 wear during continued use, the adjusting mechanism nevertheless remains tightly engaged therewith, because of the bevel or taper of the flanges 41 and 43, as the spool simply moves a little closer to the rail when the rail wears down.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic easel comprising a base board, an open rectangular frame hinged to said base board at one edge for swinging movement upwardly away from said board and downwardly toward said board, said rectangular frame including at least two rail portions extending along two adjacent sides of the rectangle, at least one adjusting carriage movably mounted for travel lengthwise along each of said two rail portions, and a masking blade fixed to each of said adjusting carriages for movement bodily therewith, characterized by the fact that each of said adjusting carriages includes a portion slidably embracing the rail on which it is mounted, a rotary member having two tapered flanges for engaging said rail at two spaced points, spring means tending to move said rotary member toward said rail to hold said tapered flanges in tight wedging contact with said rail, and a manually accessible manipulating knob operatively connected to said rotary member to turn said rotary member to drive said carriage along the rail on which it is mounted, thereby to adjust the position of the masking blade mounted on the carriage.

2. A photographic easel comprising a base board, a rail mounted for upward and downward swinging movement relative to said board, a masking blade, and adjusting mechanism for mounting said blade adjustably on said rail, characterized by the fact that said adjusting mechanism comprises:

(a) a carriage body of hollow cross section embracing said rail loosely in one direction;
   (b) a rotary member rotatably mounted within said carriage body and including:
      (i) a pair of flanges having oblique surfaces faced inwardly toward each other, and (ii) a portion of reduced diameter between said two flanges, (c) means mounting said rotary member for limited lateral bodily movement relative to said carriage body in a direction toward and away from said rail and for restraining said rotary member against bodily movement relative to said carriage body in a direction longitudinally of said rail;

(d) spring means urging said rotary members toward said rail so that said oblique surfaces of said flanges will engage said rail with a tight wedging action; and (e) a manually rotatable knob located externally of said carriage body and operatively connected to said rotary member so that rotation of said knob will turn said rotary member and cause the wedging oblique surfaces thereof to roll on said rail and move said carriage body longitudinally along said rail.

3. A construction as defined in claim 2, wherein said rail is of rectangular cross section, said carriage body snugly embraces two opposite sides of said rail and a third side thereof and is substantially spaced from the fourth side, and said flanges on said rotary member engage the edge corners of the fourth side of said rail.

4. A construction as defined in claim 2, wherein said spring means includes a bearing block bearing against said reduced diameter portion of said rotary member, and two coiled springs engaging said bearing block near opposite ends thereof and exerting pressure against said bearing block in a direction to cause the bearing block to press said rotary member tightly against said rail.

5. Photographic apparatus comprising a rail having two corners extending parallel to each other and lengthwise to the rail, a member mounted on said rail for movement to various positions of adjustment along said rail, characterized by adjusting mechanism comprising:

(a) a carriage slidably engaging the rail, said member being mounted on said carriage to move bodily therewith;

(b) a spool-like rotary member mounted on said carriage and having two flanges spaced from each other and having inner faces arranged obliquely, farther apart at their outer edges and closer to each other inwardly from said outer edges, (c) the oblique faces of said flanges of said rotary member being engaged respectively with said two corners of said rail;

(d) spring means operatively interposed between said carriage and said rotary member and acting in a direction tending to wedge said obliquely arranged faces of said rotary member tightly against two corners of said rail;

(e) manually operable means for turning said rotary member to cause it to travel along said rail; and (f) means restraining relative movement between said rotary member and said rail in a direction lengthwise of said rail, so that the movement of said rotary member along said rail as a result of rotation of said rotary member will carry said carriage along said rail with it;

(g) said rotary member having limited movement relative to said carriage in a direction toward and away from said rail, so that said obliquely arranged faces on said rotary member will remain in tight wedging engagement with said corners on said rail under the influence of said spring means, notwithstanding wear of said corners and said faces under continued use.

6. A construction as defined in claim 5, in which said carriage comprises:

(i) a main body portion of generally U-shaped cross section with parallel side flanges receiving said rail between them, the space between said side flanges being substantially greater than the corresponding dimension of the rail received between them; and (ii) two stirrup-like members fixed to said main body portion in positions spaced from each other in a direction lengthwise of the rail, each stirrup-like member having side flanges snugly embracing two opposite sides of said rail and lying inside the side flanges of the main body portion to space the side flanges of the main body portion from the rail, and having a base flange snugly embracing the rail on the side thereof remote from said rotary member.

7. A construction as defined in claim 6, in which the space between said two stirrup-like members, in a direction lengthwise of said rail, is at least as great as the maximum diameter of said rotary member.

References Cited by the Examiner

UNITED STATES PATENTS

| | | | |
|---|---|---|---|
| 2,256,894 | 9/1941 | Chadkin | 88—24 |
| 2,315,066 | 3/1943 | Lund | 88—24 |
| 2,342,525 | 2/1944 | Berry | 88—24 |
| 2,848,923 | 8/1958 | Diefenbach | 88—24 |

NORTON ANSHER, *Primary Examiner.*